United States Patent [19]

Kawawada

[11] Patent Number: 5,078,463
[45] Date of Patent: Jan. 7, 1992

[54] LASER BEAM SCANNING DEVICE

[75] Inventor: Naoki Kawawada, Tokyo, Japan

[73] Assignee: Seiko Instruments Inc., Japan

[21] Appl. No.: 389,043

[22] Filed: Aug. 3, 1989

[30] Foreign Application Priority Data

Aug. 6, 1988 [JP] Japan .................. 63-196690

[51] Int. Cl.⁵ .............................................. G02B 26/10
[52] U.S. Cl. ............................................. 359/201
[58] Field of Search ................ 350/6.7, 6.8, 6.1, 6.5

[56] References Cited

U.S. PATENT DOCUMENTS

| | | | |
|---|---|---|---|
| 4,139,258 | 2/1979 | Oharek | 350/6.8 |
| 4,288,822 | 9/1981 | Hareng et al. | 358/296 |
| 4,302,782 | 11/1981 | Gunning | 358/296 |
| 4,312,590 | 1/1982 | Harbaugh | 350/6.7 X |
| 4,314,154 | 2/1982 | Minoura et al. | 350/6.7 X |
| 4,616,132 | 10/1986 | Kessler | 358/494 X |

FOREIGN PATENT DOCUMENTS 38724  3/1984  Japan .................. 350/6.8

OTHER PUBLICATIONS

Patent Abstracts of Japan, Vol. 8, No. 137 (P-282) [1574], Jun. 26, 1984, Canon K.K.

*Primary Examiner*—Bruce Y. Arnold
*Assistant Examiner*—David R. Parsons
*Attorney, Agent, or Firm*—Bruce L. Adams; Van C. Wilks

[57] ABSTRACT

A laser beam scanning device is comprised of a laser beam source for emitting a laser beam, a polygon mirror rotatable for reflecting the laser beam to deflect the same linearly in primary scanning direction and a main motor for rotating the polygon mirror. An optically converging system converges the laser beam reflected from the polygon mirror onto a photosensitive medium. A secondary scanning system includes a driving source having a pulse motor for shifting the laser beam relative to the photosensitive medium in secondary scanning direction substantially perpendicular to the primary scanning direction to thereby scan the laser beam two-dimensionally on the photosensitive medium. A controlling circuit produces a common clock signal for controlling and driving the main motor and the pulse motor according to the common clock signal.

18 Claims, 5 Drawing Sheets

LASER BEAM SCANNING DEVICE

BACKGROUND OF THE INVENTION

The present invention relates to a laser beam scanning device for deflecting a laser beam in order to scan the same on a photosensitive medium.

FIG. 2 is a schematic view of the conventional laser beam scanning system utilized in a laser printer. As shown, the laser beam scanning system uses, as a laser beam source a semiconductor laser 1. By turning the source on and off in response to a laser modulation, signal inputted according to an image signal the generation of the laser beam can be controlled. The laser beam scanning system is further comprised of; a collimator lens 2 for collimating the laser beam emitted from the semiconductor laser 1 into a substantially parallel laser beam, a polygon mirror 3 rotatable at a predetermined rotational number to deflect the laser beam passed from the collimator lens 2 in a primary scanning direction, an $f\theta$ lens 5 disposed between the polygon mirror 3 and a photosensitive drum 4 for converging the laser beam reflected by the polygon mirror 3 onto the photosensitive drum 4, a pair of preceding cylindrical lens 6 disposed between the collimator lens 2 and the polygon mirror 3 and a succeeding cylindrical lens 7 disposed between the $f\theta$ lens 5 and the photosensitive drum 4 for compensating for inclinations of reflective surfaces of the polygon mirror, and a photodetector 8 for detecting a starting position where the laser beam begins to write in the primary scanning direction, passed from the succeeding cylindrical lens 7. The $f\theta$ lens 5 and cylindrical lens 7 constitute an optical converging system for converging the reflected beam from the polygon mirror onto the surface of photosensitive medium. A polygon mirror driving system is comprised of; a polygon motor 9 of the DC motor type, a combination of a rotary encoder 13 and a photointerrupter 14 for detecting a rotation number of the motor 9, and a polygon motor driving circuit 15.

A secondary scanning system functions to rotate the photosensitive drum. In similar manner to the polygon mirror driving system, the secondary scanning system is comprised of a DC motor 10 for rotating the photosensitive drum 4, the combination of a rotary encoder 11 and a photointerrupter 12 for detecting a rotation number of the DC motor 10, and a photosensitive drum motor rotating or driving circuit 16.

Since both the polygon motor 9 and photosensitive drum motor 10 need to control their rotation number, separate, conventional rotation number controlling circuits are provided in the respective driving circuits. Since the polygon motor driving circuit 15 and the photosensitive drum motor rotating circuit 16 have the same basic structure, the polygon motor driving circuit 15 will be explained for example hereinbelow.

FIG. 3 is a block diagram of the conventional polygon motor driving circuit. In FIG. 3, an oscillating source circuit 91 utilizes a quartz resonator, and an output signal thereof is inputted into a frequency-dividing circuit 92. On the other hand, the photointerrupter 14 cooperates with the rotary encoder 13 directly connected to a shaft of the motor 9 to output a detection signal in synchronization with the rotation of the motor. The detection signal is input to a waveform shaping circuit 96 effective to remove distortion of a waveform of the detection signal, and thereafter an output signal of the waveform shaping circuit 96 is input to a phase comparator 93 to effect phase comparison with respect to the output signal from the frequency-dividing circuit 92. An output signal of the phase comparator 93 is input to an integral circuit 94 to change the same into a voltage signal. The voltage signal of the integral circuit 94 is input to an amplifying circuit 95 to produce the electric power needed for driving the motor. Then the output power of the amplifying circuit 95 is applied to the motor 9. Such circuit structure is known generally as a Phase-Locked Loop (PLL) control circuit. Consequently, in the conventional laser beam scanning device, a pair of PLL control circuits are provided independently from each other for controlling the rotation number of the polygon motor 9 and the DC motor 10 operative to rotate the photosensitive medium, separately from each other.

The overall operation of the conventional device will be briefly described with reference to FIG. 2. First, the polygon mirror 3 is rotated with a given rotation number by means of the polygon motor driving circuit 15. The rotation number of the polygon mirror 3 is monitored by means of the combination of slits cut on a circumference of the rotary encoder 13 directly connected to the shaft of the motor 9 and the photointerrupter 14. Namely, the photointerrupter produces a pulsed, detection signal having a frequency proportional to the rotation number of the motor 9. Then, the pulsed signal is phase-compared with the reference clock signal from the frequency dividing circuit in the polygon motor driving circuit 15 so as to effect the PLL control to rotate the motor 9 at a constant rotation number. Next, cleaning and corona charging are carried out for preparation of image writing on the photosensitive medium.

Thereafter, in order to rotate the photosensitive drum 4 at a predetermined secondary scanning speed, the photosensitive drum rotating circuit 16 effects PLL control of the rotation number of the DC motor 10.

Then, when the photosensitive drum 4 comes to a vicinity of a predetermined angular position, the semiconductor laser is turned on and the polygon mirror 3 reflects the laser beam to scan the laser beam in the primary scanning direction. After a given time interval from a time when the scanned laser beam crosses the photosensor 8, the semiconductor laser is turned on and off according to an inputted image signal to effect writing of the first line of the image. During the writing of the first line, the photosensitive drum 4 continues to rotate at the constant rotation number and the photodetector 8 detects the starting position of writing in the primary scanning direction. Therefore, while aligning the starting position of writing of each line, the second and subsequent lines are written on the drum without duplication to thereby reproduce the two-dimensional image. The rotation speed of the photosensitive drum 4 is PLL-controlled so as to equalize a pitch of the respective lines. By carrying out this writing operation for all of the lines or rows, the desired two-dimensional image can be reproduced on the photosensitive drum 4.

However, the laser beam scanning system of the above described structure operates based on the rotation number control of the photosensitive drum driving system and does not have a function to directly control the angular position of the drum. Further, the rotation number control system of the polygon mirror and the rotation number control system of the photosensitive drum are operated independently of each other so that the conventional device has drawbacks or problems such as: (1) the starting position of each line of writing is not accurately aligned in the direction of the secondary scanning, stated otherwise the pitch of the lines is not sufficiently accurate as to enable the precise color image reproduction, and (2) it is not possible to start writing of each line from a desired position of the secondary scanning, stated otherwise each position of the lines is not changed or adjusted for various printing condition.

SUMMARY OF THE INVENTION

In order to solve the above noted problems, an object of the present invention is to synchronize the primary or horizontal scanning of the laser beam and the secondary or vertical scanning of the laser beam with each other so as to effect accurate image reproduction. According to the present invention, a pulse motor is utilized as a driving source of the secondary scanning drive means, and a common oscillating source is utilized to produce a basic clock signal for use in generation of driving or activating pulses of the pulse motor and to produce a reference clock signal for use in the PLL control of the rotation number of the polygon mirror such that the basic and reference clock signals have the identical phase and frequency so as to effect accurate two-dimensional scanning of the laser, beam.

By such construction, it is possible to (1) monitor the scanning position in the secondary or vertical scanning direction by counting a number of the driving pulses, and to (2) synchronize the primary or horizontal scanning by the polygon mirror and the secondary or vertical scanning by the pulse motor with each other.

DETAILED DESCRIPTION OF THE EMBODIMENTS

Figure 1:
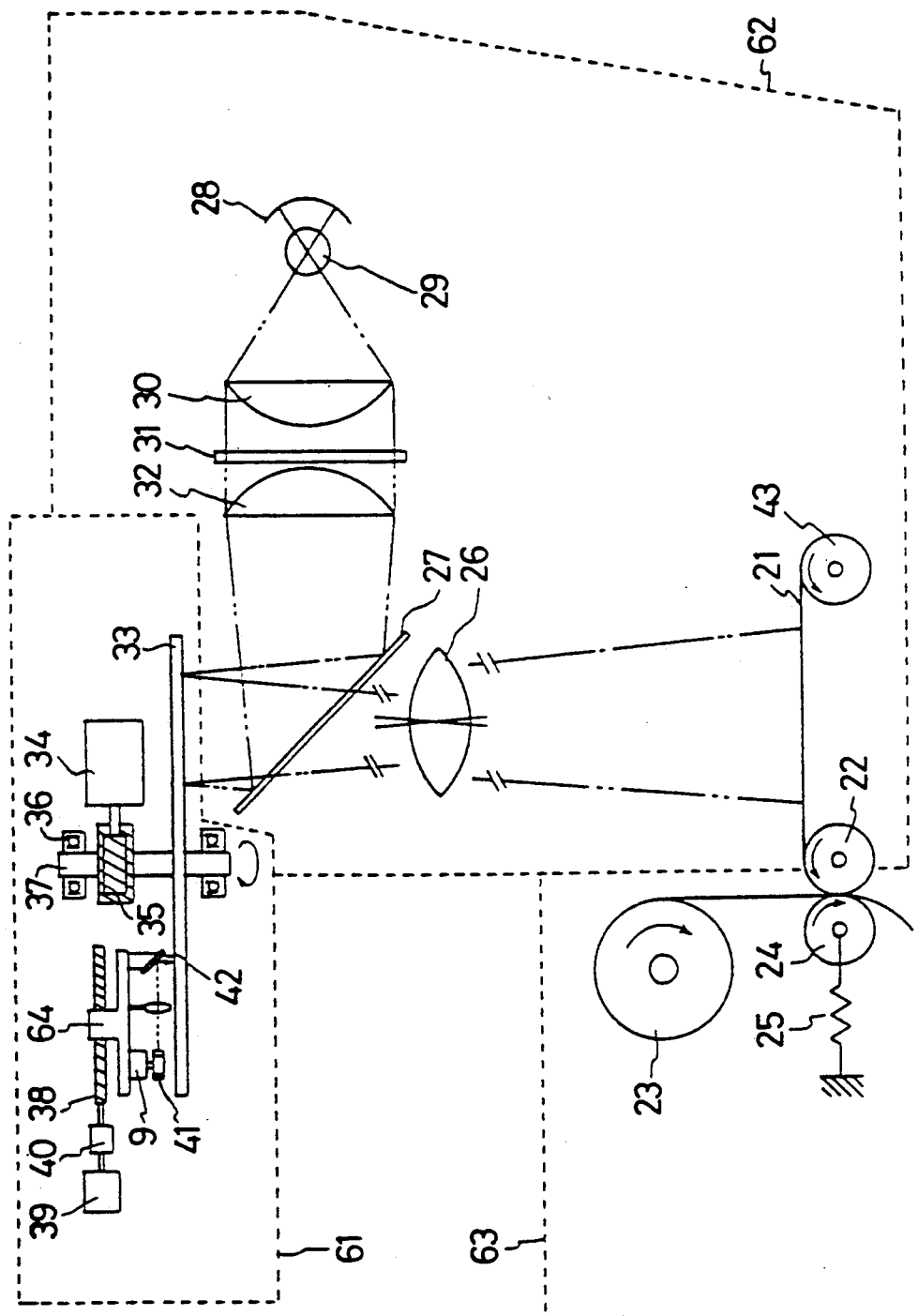
FIG. 1 is a schematic overall view of a multicolor projecting apparatus applied with the laser beam scanning device according to the present invention.
Figure 2:
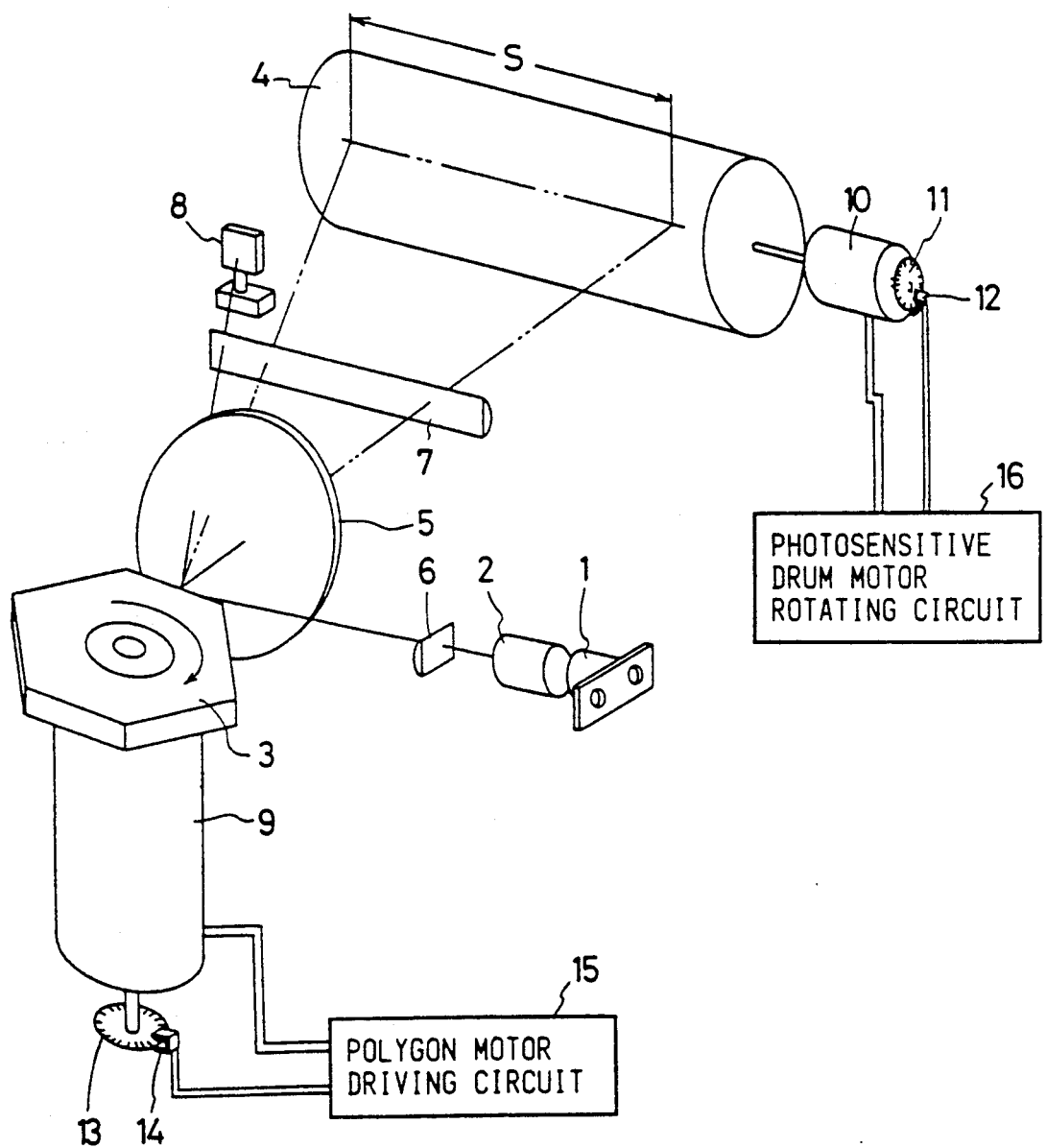
FIG. 2 is a schematic overall view of the conventional laser beam scanning device.

Hereinafter, embodiments of the present invention will be explained in conjunction with the drawings. FIG. 1 is an overall structural view of a multicolor projecting exposure apparatus utilizing a liquid crystal cell of the laser-written type as an intermediate image medium or photosensitive medium and employing an inventive laser beam scanning device. In FIG. 1, the multicolor projecting exposure apparatus is comprised of a projecting exposure system 62, an image writing system 61 including the laser beam scanning device and a developing system 63.

The projecting exposure system 62 is comprised of a halogen lamp 29, a reflecting mirror 28 effective to increase light collecting efficiency, a pair of condenser lenses 30 and 32 for converting light emitted from the halogen lamp 29 into somewhat of a converging light beam; a filter 31 disposed between the condenser lenses 30 and 32 for cutting off a thermal beam contained in the light beam; a half mirror 27 for reflecting the light beam from the halogen lamp 29 to a liquid crystal cell on a rotating or rotary disc 33 and for passing a reflected light beam from the liquid crystal cell; a projecting lens 26 for projecting and focusing the light beam transmitted from the half mirror 27 onto a photosensitive film 21, a winding roller 22 for winding the photosensitive film 21, and a back tension roller 43 for uniformly tensioning the photosensitive film 21. The photosensitive film 21 is composed of a microcapsule sheet produced by the Mead Company of the U.S.A. The microcapsule sheet is composed of PET film coated uniformly with three different kinds of microcapsules composed of a thin film enclosure made of, for example, gelatin and containing three different color formers a1, a2 and a3 exhibiting cyan, magenta and yellow tones, respectively, and three different photosensitive compositions b1, b2 and b3 photosensitive to light having different wavelengths $\lambda 1$, $\lambda 2$ and $\lambda 3$ corresponding to the respective color formers and effective to change their own viscosity to immobilize the color formers.

Figure 4:
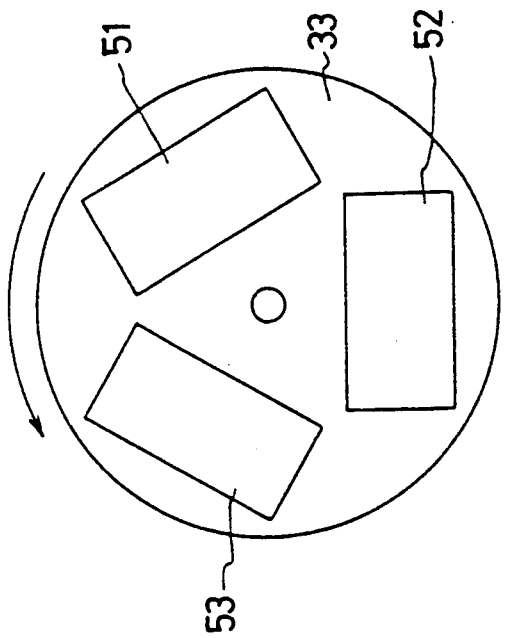
FIG. 4 is a plan view of a rotating disc for use in the FIG. 1 apparatus.

The image writing system 61 is comprised of a laser beam primary scanning unit including a semiconductor laser (not shown), a polygon mirror 41, a main motor 9 for rotating the polygon mirror 41, and a reflecting mirror 42, a bowl screw 38 for driving a base 64 mounting thereon the laser beam primary scanning unit in a secondary scanning direction, a pulse motor 39 for rotating the bowl screw 38, a flexible coupling 40 connecting between the bowl screw 38 and the pulse motor 39, a rotary disc 33 (FIG. 4 shows its plan view), another pulse motor 34 for rotating the rotary disc 33 around a shaft 37, a worm wheel 35 for transmitting a driving force from the pulse motor 34 to the shaft 37, and a bearing 36 for supporting the shaft 37. The base 64, bowl screw 38 and pulse motor 39 constitute a secondary scanning unit.

As shown in FIG. 4 of plan view, the rotational disc 33 is provided with liquid crystal cells or panels 51, 52 and 53 for exposures of yellow, cyan and magenta, respectively. The respective liquid crystal panels 51, 52 and 53 are disposed around the rotational shaft at equiangular distance of 120°. Each liquid crystal panel can be written thereon by an image by means of a scanned laser beam.

The developing system 63 is comprised of a feeding roller 23 for feeding a receiver sheet coated uniformly with developer effective to react with the color formers a1, a2 and a3 on the photosensitive film to cause color development reaction, a pressing roller 24 for pressing the superposed photosensitive film 21 and receiver sheet to each other, and a pressing spring 25 for applying a pressing force to the pressing roller 24.

Figure 3:
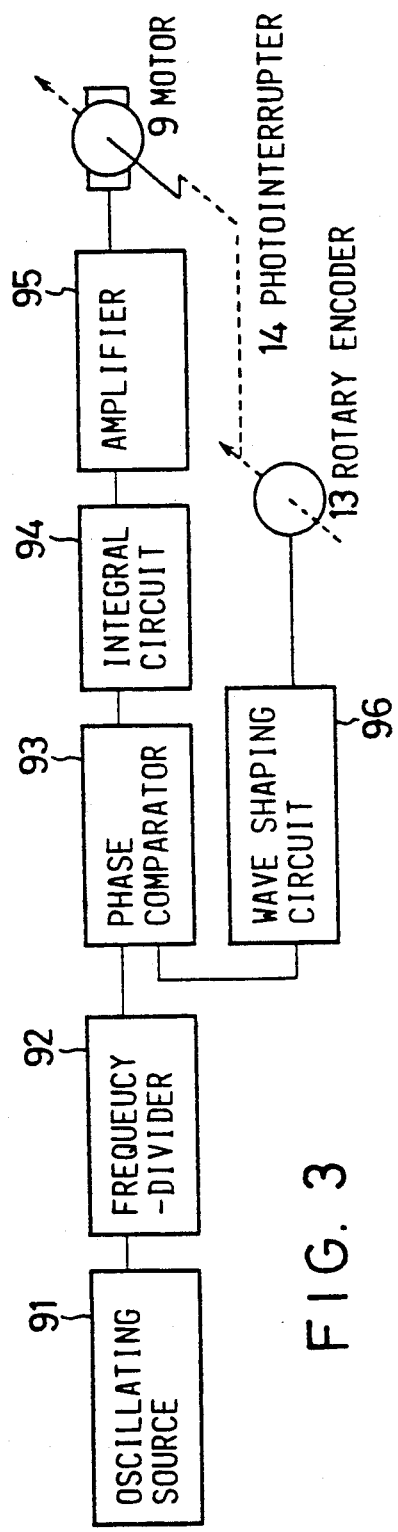
FIG. 3 is a block diagram of a polygon motor driving circuit in the conventional device.
Figure 7:
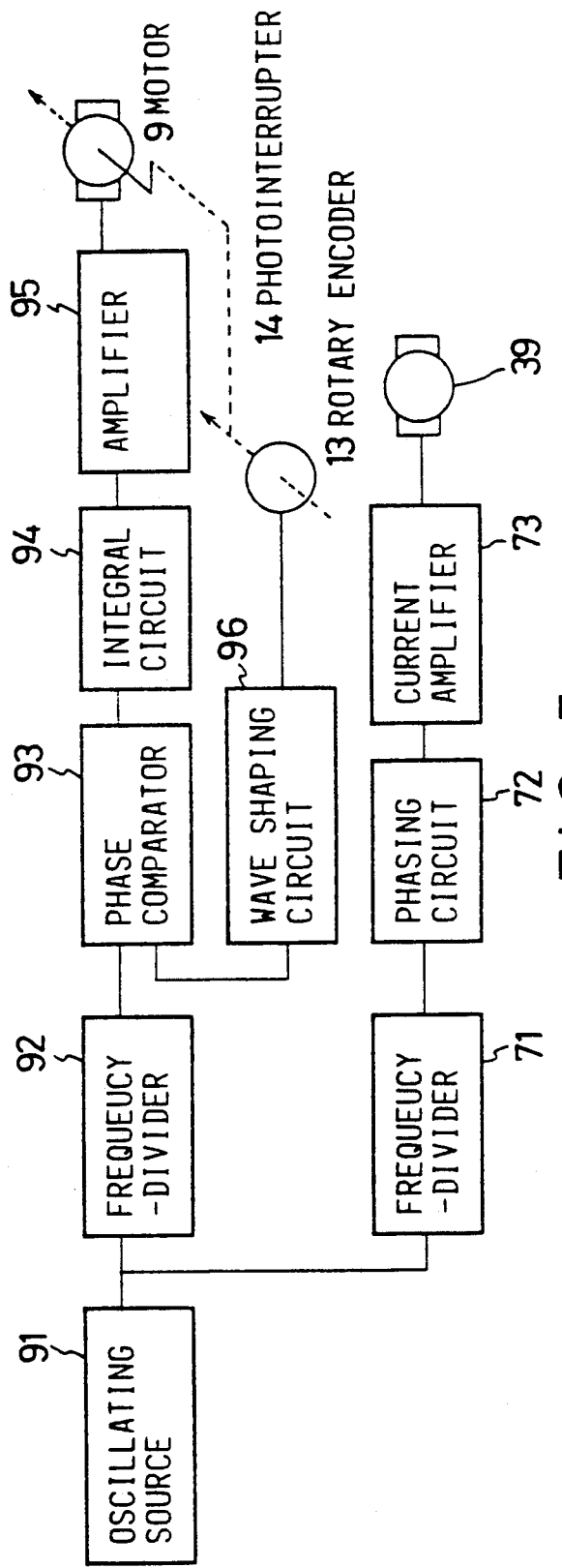
FIG. 7 is a circuit block diagram of a motor control system according to the present invention.

FIG. 7 shows a circuit diagram of the image writing system 61 or laser scanning device including a PLL-control or feedback circuit of the polygon motor 9 and a driving or feed forward circuit of the pulse motor 39. The PLL-control circuit has the same structure as the conventional circuit shown in FIG. 3 and includes an oscillating source circuit 91 utilizing a quartz resonator and generating an oscillating clock signal effective to regulate the rotation of the polygon mirror as a reference signal or clock pulses. The pulse motor driving circuit shares the common oscillating source circuit 91, and includes a frequency-dividing circuit 71 for frequency-dividing the basic oscillating signal outputted from the oscillating source circuit 91 to reduce its frequency to a necessary number, a phasing circuit 72 for phasing the output signal from the frequency-dividing circuit 71 to apply phased signal components to respective coils of the pulse motor 39 to set timings of activation of the respective coils, and a current amplifier 73 receptive of the output signal components from the phasing circuit 72 to amplify the same to apply driving current pulses needed to actually drive the pulse motor 39.

Figure 5:
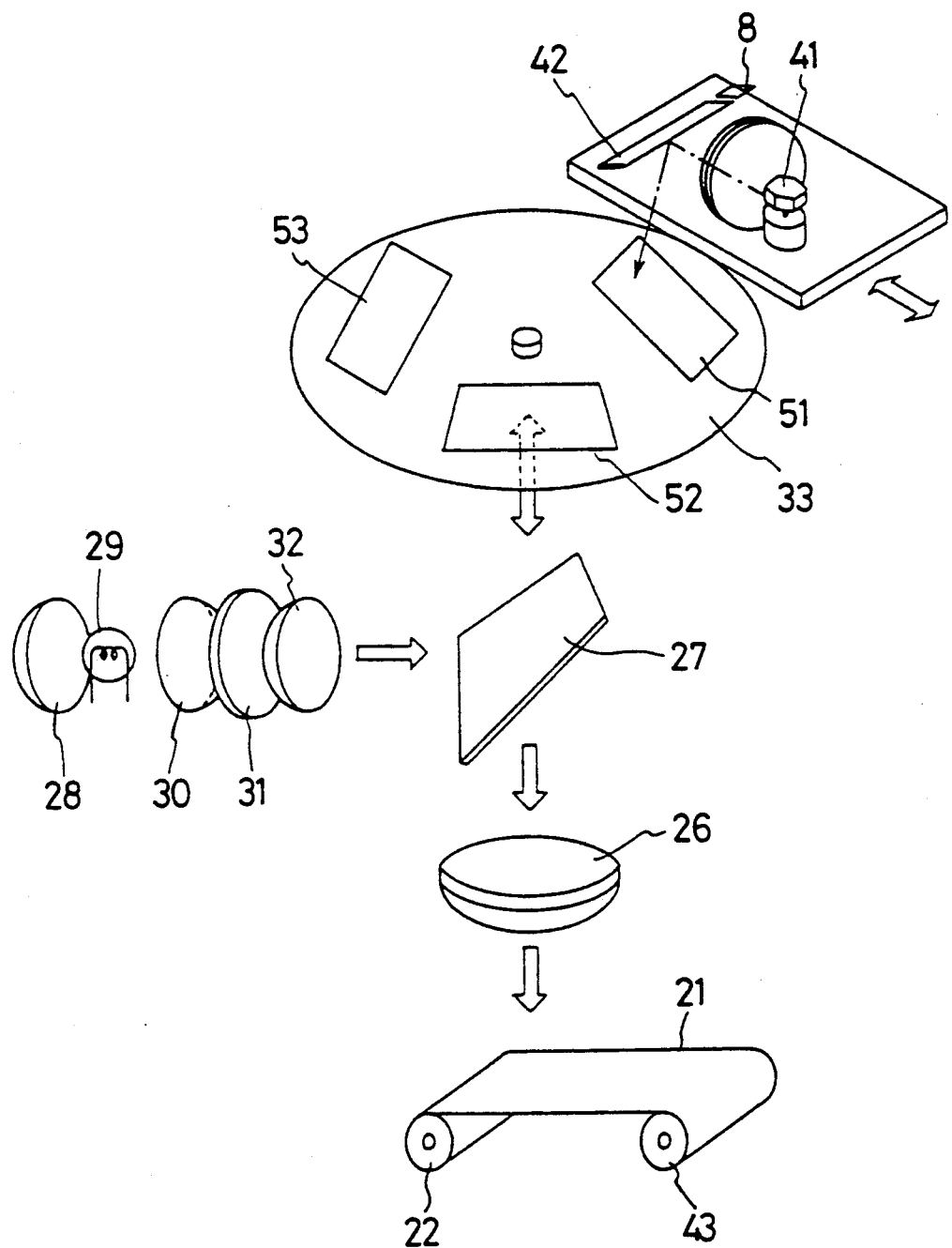
FIG. 5 is an exploded view of the color projection exposure apparatus provided with the inventive laser beam scanning device.

Next, the operation of the multicolor projecting exposure apparatus will be explained with reference to an explanatory diagram of FIG. 5. First, the rotational disc 33 is angularly displaced to position the liquid crystal panel 51 for yellow color exposure under the laser beam scanning device.

Figure 6:
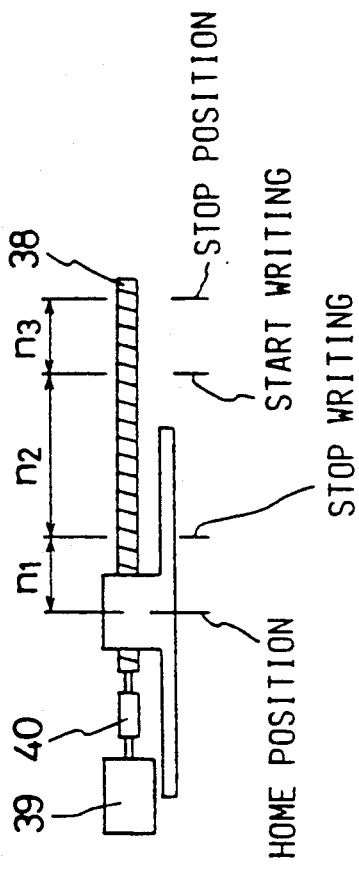
FIG. 6 is a sectional view of a laser beam scanning unit.

Then, the secondary scanning unit is initially moved to a home position as shown in FIG. 6 which shows moving positions of the secondary scanning unit. Then, the secondary scanning unit is started to move in the secondary scanning direction by means of the pulse motor 39. When the pulse motor 39 for driving the bowl screw is applied with n1 number of the driving current pulses and the secondary scanning unit arrives at a position to stop writing, the writing of yellow color image component is started by scanning the laser beam two-dimensionally in the primary and secondary scanning directions. When the pulse motor 39 receives n2 number of the driving current pulses from the starting of writing and the secondary scanning unit arrives at a position to stop writing, the writing operation is stopped while the pulse motor 39 is continuously applied with the driving current pulses. When the pulse motor 39 receives n3 number of the pulses after the termination of writing operation and the secondary scanning unit arrives on a stop position, the application of pulses is terminated to the driving of pulse motor 39. By such operation, the yellow color image component is written into the liquid crystal panel 51.

In the next step, n1+n2+n3 number of driving current pulses are applied to the pulse motor 39 reversely to return the movable secondary scanning unit to its home position. During this operation, the rotational disc 33 is angularly displaced to position the liquid crystal panel 52 for cyan color exposure in place under the laser beam scanning device. Thereafter, a cyan color image component is written onto the liquid crystal panel 52 for use in cyan color exposure in a similar manner to the writing operation of yellow color image component onto the first liquid crystal panel for use in the yellow color exposure.

Further, in similar manner, the returning operation of the secondary scanning unit and the angular displacement of the rotational disc 33 are carried out to switch from the cyan-color-related liquid crystal panel 52 to the magenta-color-related liquid crystal panel 53. Then, using a similar writing operation, the magenta color image component is written into the magenta-color related liquid crystal panel 53.

Next, after the writing, the liquid crystal panels are irradiated with light from the halogen lamp 29. The liquid crystal panels reflect the light and the reflected light is projected onto the photosensitive film 21 through the projecting lens 26 to superpose the yellow, cyan and magenta color image components on the photosensitive film 21 to compose a color image. In detail, the rotational disc 33 is angularly displaced to position the yellow-color-related liquid crystal panel 51 in alignment with the photosensitive film 21, and projection and exposure of the yellow color image component is carried out onto the film 21. After the yellow color image component is formed onto the photosensitive film 21, the rotational disc 33 is angularly displaced and the cyan color image component written in the liquid crystal panel 52 is projected and exposed onto the same portion of the photosensitive film 21 to superpose the yellow and cyan color image components to each other. In the same manner, the magenta color image component of the liquid crystal panel 53 is projected and exposed onto the film so that the yellow, cyan and magenta color image components are superposed to compose the color image. By such an operation, the starting positions of image writing are coincident in the respective liquid crystal panels 51, 52 and 53 for use in the respective yellow, cyan and magenta color exposures in both the primary scanning direction by means of the optical sensor 8 and of the secondary scanning direction by means of the pulse motor 39 according to the writing timing control shown in FIG. 6. Accordingly, the yellow, cyan and magenta color image components projected onto the photosensitive film 21 are perfectly matched to avoid color dislocation.

In the present embodiment, a liquid crystal panel of the laser beam written type is used as an intermediate image-writing medium. However, the medium is not limited to the liquid crystal panel, but other types of medium can be used such as a photosensitive drum and selenium plate. Further, while the liquid crystal panels are switched by angular displacement of a rotational disc in the present embodiment, other method and structure can be utilized such as shifting the medium along a guide rail so as to obtain the same function.

As described above, according to the present invention, while maintaining the conventional primary scanning system and without providing an additional position sensor, the image can be written and reproduced from a desired position in the secondary scanning direction.

What is claimed is:

1. A laser beam scanning device comprising:
a laser beam source for emitting a laser beam;
a rotatable polygon mirror for reflecting the laser beam in a primary scanning direction;
a main motor for rotating the polygon mirror;
optical converging means for converging the laser beam reflected from the polygon mirror onto a photosensitive medium;
secondary scanning means including a driving source having a pulse motor for shifting the laser beam relative to the photosensitive medium in a secondary scanning direction substantially perpendicular to the primary scanning direction to thereby scan the laser beam two-dimensionally on the photosensitive medium; and
controlling means for producing a common clock signal and for controlling and driving the main motor and the pulse motor according to the common clock signal.

2. A laser beam scanning device according to claim 1; wherein the secondary scanning means comprises a secondary scanning unit having mounted thereon the laser beam source, the polygon mirror and the main motor, the secondary scanning unit being movable in the secondary scanning direction, and the pulse motor being connected to move the secondary scanning unit relative to the photosensitive medium.

3. A laser beam scanning device according to claim 2; wherein the secondary scanning means comprises means for starting the writing of an image by scanning the laser beam after the pulse motor is applied with a first number of driving current pulses from a home position, then stopping the writing operation when the pulse motor receives a second number of driving current pulses from the starting of writing, then terminating the application of pulses to stop the driving of the pulse motor when the pulse motor receives a third number of driving current pulses after the termination of the writing operation, and then applying the first number, the second number and the third number of driving current pulses to the pulse motor to return the secondary scanning unit to its home position.

4. A laser beam scanning device according to claim 2; wherein the scanning unit includes means for returning the scanning unit to the home position after the termination of the writing operation.

5. A laser beam scanning device according to claim 1; wherein the controlling means includes an oscillating source circuit for producing the common clock signal, feedback control means for monitoring a rotation number of the main motor to regulate the rotation number according to the common clock signal, and feedforward control means for applying driving current pulses to the pulse motor in synchronization with the common clock signal.

6. A laser beam scanning device according to claim 1; wherein the photosensitive medium is a liquid crystal panel.

7. A laser beam scanning device comprising:
a laser beam source for emitting a laser beam;
a rotatable polygon mirror for reflecting the laser beam in a primary scanning direction.
a main motor for rotating the polygon mirror;
a photosensitive medium comprising a rotational disc, a rotational shaft and three liquid crystal panels disposed on the rotational disc around the rotational shaft at an equi-angular distance of 120°;
optical converging means for converging the laser beam reflected from the polygon mirror onto the photosensitive medium;
secondary scanning means including a driving source having a pulse motor for shifting the laser beam relative to the photosensitive medium in a secondary scanning direction substantially perpendicular to the primary scanning direction to thereby scan the laser beam two-dimensionally on the photosensitive medium; and
controlling means for producing a common clock signal and for controlling and driving the main motor and the pulse motor according to the common clock signal.

8. An optical beam scanning device comprising:
an optical beam source for emitting an optical beam;
a rotatable polygon mirror for reflecting the optical beam to deflect the beam linearly in a primary scanning direction;
a first motor for rotating the polygon mirror;
optical converging means for converging the optical beam reflected from the polygon mirror onto a photosensitive medium; and
secondary scanning means including a driving source having a second motor for shifting the optical beam relative to the photosensitive medium in a secondary scanning direction substantially perpendicular to the primary scanning direction to thereby scan the optical beam two-dimensionally on the photosensitive medium;
wherein the first motor and the second motor are operative according to a common clock signal whereby the starting positions of each lie of writing are at the same position.

9. An apparatus for synchronizing the scanning of a laser beam, comprising:
a light source for transmitting a laser beam;
movable scanning means positioned in the path of the laser beam and responsive to first synchronizing control signals for scanning the laser beam in a first scanning direction according to the first control signals;
driving means connected to the scanning means and responsive to second synchronizing control signals for moving the scanning means in a second scanning direction substantially perpendicular to the first scanning direction so as to scan the laser beam in the second scanning direction according to the second control signals; and
control means for generating the first and second synchronizing control signals and for applying the first and second control signals to the scanning means and the driving means to effect synchronized scanning of the laser beam in the first and second scanning directions, the control means including clock generating means for generating clock signals and converting means receptive of the clock signals for converting the clock signals into the first and second synchronizing control signals.

10. An apparatus according to claim 9; wherein the scanning means includes at least one rotatable polygon mirror for scanning the laser beam in the first scanning direction.

11. An apparatus according to claim 10; wherein the control means includes detecting means for detecting the speed of rotation of the polygon mirror and for outputting detection signals representative of the detected speed.

12. An apparatus according to claim 11; wherein the converting means includes processing means receptive of the detection signals and the clock signals for processing the detection and clock signals to produce the first synchronizing control signals.

13. An apparatus according to claim 9; wherein the driving means comprises pulse generating means receptive of the clock signals for generating pulsed control signals representative of the second synchronizing control signals, a movable base connected to the scanning means, and at least one pulse motor receptive of the pulsed control signals for moving the base and scanning means in the second scanning direction according to the pulsed control signals.

14. An apparatus for reproducing an original image on a photosensitive sheet, comprising:
a light source for transmitting a laser beam representative of an original image;
movable scanning means positioned in the path of the laser beam and responsive to first synchronizing control signals for scanning the laser beam in a first scanning direction according to the first control signals;
driving means connected to the scanning means and responsive to second synchronizing control signals for moving the scanning means in a second scanning direction substantially perpendicular to the first scanning direction so as to scan the laser beam in the second scanning direction according to the second control signals;

control means for generating the first and second synchronizing control signals and for applying the first and second control signals to the scanning means and the driving means to effect synchronized scanning of the laser beam in the first and second scanning directions, the control means including clock generating means for generating clock signals and converting means receptive of the clock signals for converting the clock signals into the first and second synchronizing control signals;

image storage means disposed to receive the laser beam scanned in the first and second scanning directions for storing the original image; and reproducing means for reproducing the original image stored in the image storage means onto a photosensitive sheet.

15. An apparatus according to claim 14; wherein the scanning means includes at least one rotatable polygon mirror for scanning the laser beam in the first scanning direction.

16. An apparatus according to claim 15; wherein the control means includes detecting means for detecting the speed of rotation of the polygon mirror and for outputting detection signals representative of the detected speed.

17. An apparatus according to claim 16; wherein the converting means includes processing means receptive of the detection signals and the clock signals for processing the detection and clock signals to produce the first synchronizing control signals.

18. An apparatus according to claim 14, wherein the driving means comprises pulse generating means receptive of the clock signals for generating pulsed control signals representative of the second synchronizing control signal, a movable base connected to the scanning means, and at least one pulse motor receptive of the pulsed control signals for moving the base and scanning means in the second scanning direction according to the pulse control signals.

* * * * *